May 17, 1966     A. F. JOHNSON     3,251,676

ALUMINUM PRODUCTION

Filed Aug. 16, 1962     3 Sheets-Sheet 1

INVENTOR
Arthur F. Johnson
BY
ATTORNEYS

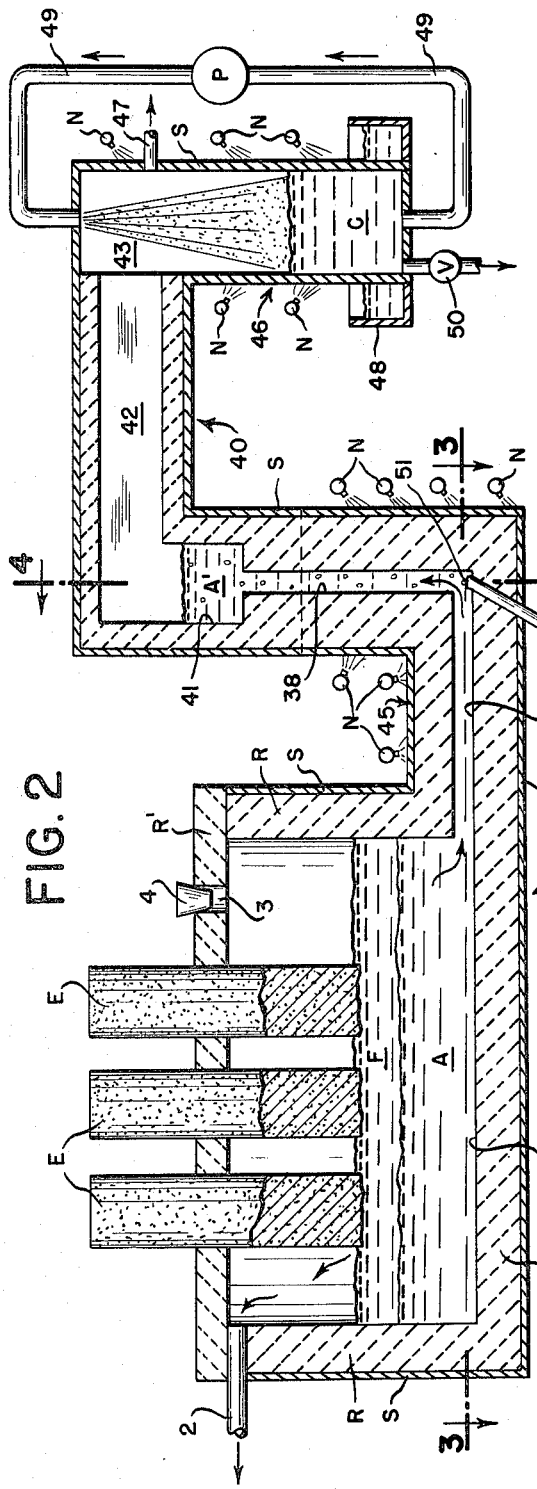

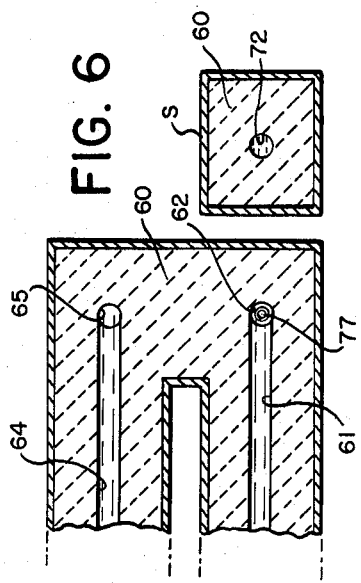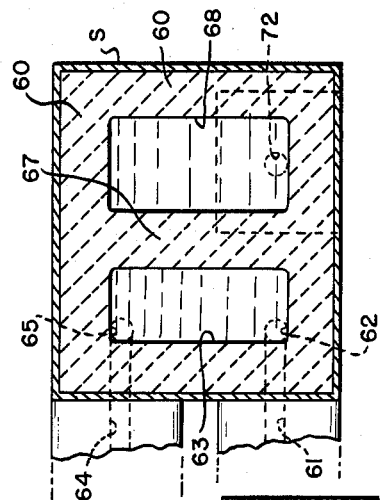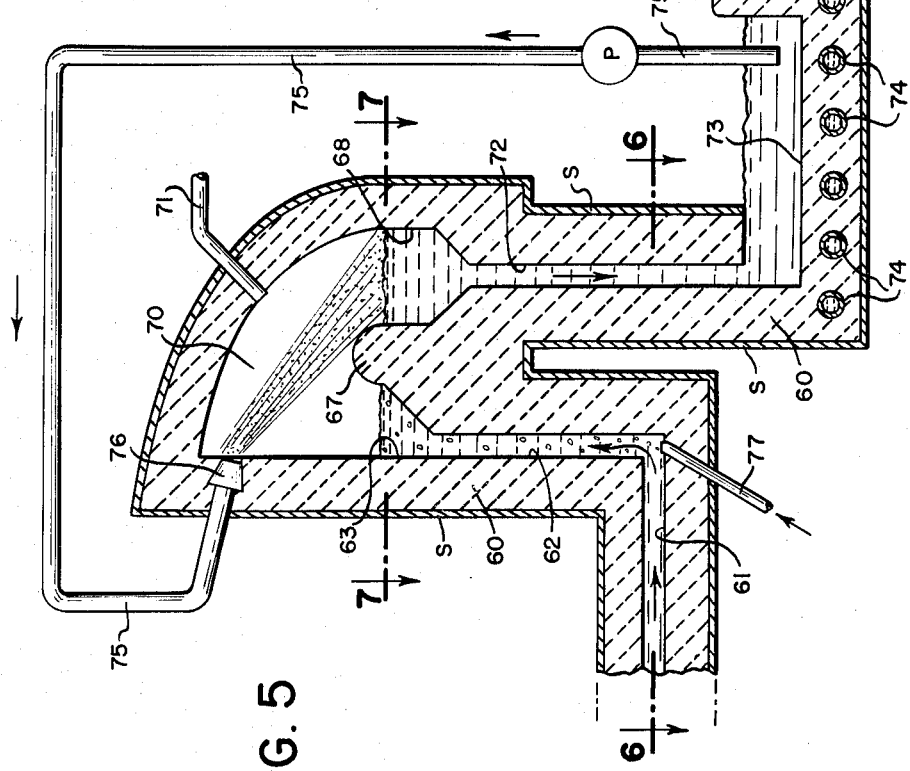

United States Patent Office 3,251,676
Patented May 17, 1966

3,251,676
ALUMINUM PRODUCTION
Arthur F. Johnson, Riverdale, N.Y.
(235 E. 42nd St., 27th Floor, New York 17, N.Y.)
Filed Aug. 16, 1962, Ser. No. 217,448
13 Claims. (Cl. 75—10)

This invention relates to the production of aluminum from oxidic raw material, and has for its object the provision of an improved process and apparatus for the electrothermal reduction of oxidic aluminum material with a carbonaceous reducing agent at high temperatures, and the recovery of metallic aluminum. The invention comprises the reduction of such oxidic material as alumina with a carbonaceous reducing agent such as carbon, coke or aluminum carbide, in an electric arc furnace, and the treatment of such aluminum-bearing material as calcined bauxite, clay or shale to convert it into suitable oxidic material for reduction in the arc furnace.

In accordance with the invention, I treat in an electric arc furnace a fusion of the aluminum oxidic material intermixed with a reducing agent at a temperature of from 1800° to 2600° C. overlying a heavy metal alloy of aluminum which is heavier and has a higher boiling point than the fusion, to reduce aluminum into the heavy metal aluminum alloy, and from time to time or continuously I feed into the arc furnace a mixture of the oxidic material and reducing agent. The aluminum alloy underlying the fusion and into which the aluminum is reduced may be formed of one or more metals which give it the desired density and high boiling point. The heavy metal must form an alloy with aluminum which is heavier than the fusion and which does not vaporize at the reduction temperatures. Suitable metals with which to alloy aluminum (hereinafter called the heavy metal alloy) may be formed consist of the following in the approximate order of suitability: iron, silicon, molybdenum, chromium, vanadium, titanium, cobalt, tungsten and zirconium. The heavy metal alloy is continuously being enriched in aluminum by the reduction and is removed from the reduction furnace for the recovery of the aluminum, and the heavy metal alloy depleted in aluminum is returned to the reduction furnace.

In one variation of my process the heavy metal alloy removed from the reduction operation is combined with magnesium or equivalent light metal to form a lighter aluminum alloy. I may continuously or from time to time draw off the heavy metal alloy of aluminum into a covered crucible or separating furnace which is evacuated while magnesium is injected near the bottom of the furnace so that the aluminum present will form a light alloy layer containing aluminum and about 25% to 30% magnesium over a heavier immiscible layer of the heavy metal alloy. The addition of the magnesium to the heavy metal alloy serves the purpose of cooling the heavy metal alloy, extracting the aluminum therefrom and making the aluminum-magnesium alloy layer immiscible with the alloy of aluminum and the heavy metal alloy depleted in aluminum is returned to the electrothermal arc reduction furnace.

The furnace in which the magnesium-aluminum alloy is formed is placed under a vacuum to distill off the magnesium and leave commercially pure aluminum after first tapping the heavy metal alloy from the furnace to effect a separation of the magnesium-aluminum alloy from the heavy metal alloy. The heavy metal alloy thus depleted in aluminum is preferably returned to the reduction operation to serve as a collection agent for the freshly reduced aluminum. This collection of the aluminum in a heavy metal alloy prevents the volatilization of aluminum from the arc furnace; which is operated at a high temperature. The magnesium similarly is used over and over again without appreciable loss to serve the functions enumerated above. Other light metals having a relatively low vapor point may be used in place of magnesium such as zinc, sodium, potassium, bismuth, antimony or cadmium. Magnesium and zinc appear to be presently the most economical for the purposes intended. Magnesium has a boiling point of 1103° C. at atmospheric pressure and when alloyed with aluminum in proportions of 20% magnesium and 80% aluminum a boiling point of 1300° C. so that when injected into the alloy of aluminum and a heavy metal having a temperature of 1800° C. or more the magnesium is volatilized and cools with 1337 calories per gram of magnesium injected until 1300° C. is reached where the aluminum present protects the volatilization of magnesium unless vacuum is applied. Since the specific heat of a heavy metal alloy such as iron-aluminum is about 0.22, a drop of 500° C. requires only 110 calories per gram attainable by injection and volatilizing magnesium to the extent of about 10% of the weight of the iron-aluminum alloy.

While removing the aluminum from the heavy alloy with magnesium, I prefer to alloy another substance such as carbon with the heavy metal. For example, in the case where iron is alloyed with aluminum to form the heavy metal alloy, I add carbon to the iron alloy as this serves both to increase the immiscibility of the iron alloy with the aluminum-magnesium layer and to give the iron a lower melting point. I aim to preform the initial separations of aluminum from the heavy metal at about 1200° C. at which temperature iron with 4.5% carbon is molten and may be tapped out of the furnace leaving the aluminum-magnesium alloy behind where further vacuum treatment will remove the magnesium. The aluminum can be refined to less than 0.10% iron with magnesium after distillation of only 0.2 to 0.5% which can be further reduced by conventional chlorinating to only a few hundredths percent magnesium in the aluminum.

In another variation of my invention, the heavy metal alloy produced in the resulting reduction is circulated into a distillation furnace operated under a vacuum to distill off aluminum leaving the heavy metal alloy depleted in aluminum which is returned to the reduction operation, and the vapors of aluminum are condensed and recovered. The condensed aluminum is used advantageously to condense the aluminum vapors.

In accordance with the process of my invention, the heavy metal aluminum alloy produced in the reduction furnace is passed upwardly into a vaporization compartment of a vacuum distillation furnace operated under a controlled vacuum, and at a temperature such that the aluminum is vaporized from the heavy metal aluminum alloy. The heavy metal alloy thus depleted in aluminum returns by gravity flow to the reduction furnace because of its relative density. One of the important features of my invention resides in the condensation of the aluminum vapor. I pass into, preferably across, the vacuum chamber in which the aluminum is undergoing vaporization liquid aluminum in a downwardly directed stream which contacts the aluminum vapor and condenses the vapor. A portion of the resulting liquid aluminum, preferably cooled to a temperature just above its melting point, is cyclically returned to the vacuum chamber to condense more aluminum. The aluminum may be charged into the vacuum chamber as a spray or shower or as a thin sheet.

The complete apparatus of the invention comprises an electric arc reduction furnace having means for feeding therein a charge of aluminum oxide and a reducing agent, a hearth for receiving and confining a bath of heavy metal aluminum alloy on which a fusion of the aluminum oxide and reducing agent floats and duct means connecting the bottom of the arc furnace hearth with a vacuum distillation furnace for the flow of the heavy metal alloy into the distillation furnace and another duct means connecting the distillation furnace to the arc furnace hearth for the return of heavy metal alloy depleted in aluminum to the arc furnace.

The distillation furnace has a chamber operated under a vacuum located above separate compartments, one for receiving the heavy metal alloy and for confining it while undergoing vaporization and another compartment for receiving condensed aluminum. In one embodiment of the invention the distillation furnace is located at a level above the hearth of the arc furnace and the aforementioned ducts extend upwardly from the arc furnace to the distillation furnace. The vacuum chamber is provided with means for injecting liquid aluminum into contact with aluminum vapor therein and the compartment for receiving condensed aluminum is connected to means for cooling the condensed aluminum to a temperature near its melting point and returning a portion of the cooled aluminum to the vacuum chamber for the condensation of the aluminum vapors.

In the accompanying drawings:

FIG. 2 is a vertical sectional view of another combination of apparatus of my invention;

FIG. 3 is a sectional view at 3—3 of FIG. 2;

FIG. 4 is a sectional view at 4—4 of FIG. 2;

Figure 1:
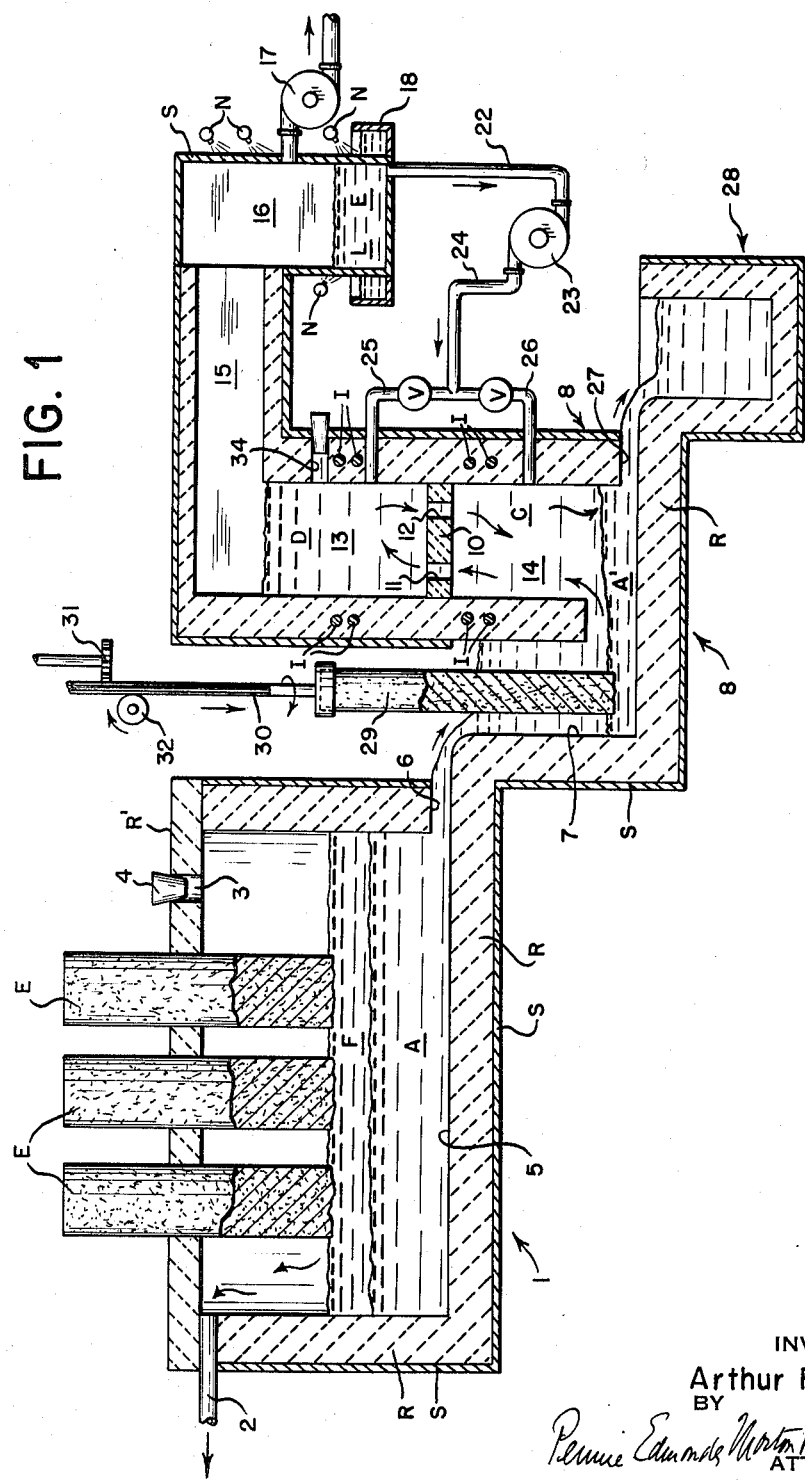
FIG. 1 is a vertical sectional view of a combination of apparatus of my invention.

FIG. 5 is a side elevation of a modification of the apparatus shown in FIGS. 2, 3 and 4; and FIGS. 6 and 7 are horizontal sectional views at 6—6 and 7—7 of FIG. 5 respectively.

The apparatus illustrated in the drawings may be used advantageously in carrying out a process of my invention.

With respect to the common apparatus of FIGS. 1 and 2, the exterior supporting structure or shell is formed of steel plate S and the refractory R is preferably of fused alumina or a high alumina refractory. The electrodes E may be carbon or graphite and there are three electrodes of a three-phase system, or multiples of three such as six or nine. The reduction arc furnace 1 has a refractory roof R' which may be of silica bricks or alumina and makes a close fit by means (not shown) with the electrodes E. A gas or vapor outlet 2 is provided at the top of one side and an opening 3 is provided in the roof for the charging of alumina or the like and a reducing agent such as coke or aluminum carbide into the reduction furnace. This opening may be closed with a plug 4. The reduction furnace has a receptacle or hearth 5 for holding a body of heavy metal alloy A over which the fusion F floats.

In the furnace of FIG. 1, the tap hole 6 in the bottom of the hearth 5 connects with the feed leg 7 for regulating the flow of heavy metal into the vacuum distillation furnace 8.

The distillation furnace has a refractory separator 10 having two restricted openings 11 and 12 which divides the distillation furnace into an upper part 13 and a lower part 14. The upper part has a lateral passageway 15 which connects with a cooled condensation chamber 16, both the passageway and the chamber being under a vacuum applied by the pump 17. The chamber shell of steel plate S is cooled by sprays of water from nozzles N and the excess water is caught in the launder 18. The bottom of condensation chamber 16 is connected by an iron pipe 22 to an iron pump 23 which is connected to iron pipe 24 which branches into iron pipes 25 and 26 which enter the upper part 13 and the lower part 14 respectively. The bottom of the distillation furnace has a tap hole 27 for flowing heavy metal alloy into the crucible 28.

The feed leg 7 has a depending graphite rod 29 supported by a holder and rod 30 attached to a rotating means 31 and a feed means 32 which rotate the rod 29 and feed it into the leg 7 as the graphite is dissolved by the heavy metal aluminum alloy, especially when the heavy metal is iron.

The modification of apparatus illustrated in FIGS. 2, 3 and 4 comprises a reduction furnace 1 identical to the reduction furnace of FIG. 1 with the exception that two closed horizontal ducts 35 and 36 connect the bottom of the reduction furnace to upright ducts 38 and 39 respectively which enter distillation furnace 40 having a vaporization compartment 41 in direct contact with ducts 38 and 39, a horizontal vacuum chamber 42 and a collection or condensation compartment 43. As illustrated, the ducts 35, 36, 38 and 39 are in spaced refractory lined members 44 and 45 and the exterior of member 45 is preferably cooled as with water sprays applied by nozzles N. It will be noted that the metal ducts 35 and 38 are smaller in diameter than ducts 36 and 39 for the purpose of directing the outward and upward flow of heavy metal alloy rich in aluminum from the reduction furnace through ducts 35 and 38 to compartment 41 of the distillation furnace, and to return heavy metal alloy depleted in aluminum from the distillation frunace through ducts 36 and 39 to the reduction furnace.

The distillation furnace includes an upright steel condensation apparatus 40 including the condensation and collection compartment 43. The pipe 47 connects to a vacuum pump so that a vacuum can be applied to vacuum chamber 42 and the compartments 41 and 43. The compartment 43 is cooled by spraying water through nozzles N on the steel shell S. The excess water is caught in the launder 48 and recirculated if desired. The bottom of compartment 43 receives the condensed aluminum and has a pipe 49 which connects through pump P to the top of the compartment 43. The pump can spray molten aluminum from pipe 49 downward into compartment 43 to facilitate condensation of the aluminum vapor.

The aluminum distillation furnace and associated apparatus shown in FIG. 5, 6 and 7 is understood to be connected along the broken line at the lower left to an arc reduction furnace as in FIG. 2. The refractory structure 60 within the steel shell S comprises horizontal duct 61 leading from the hearth of the reduction furnace to upright duct 62 connecting to the varporization compartment 63. The heavy metal aluminum alloy rich in aluminum flows through ducts 61 and 62 to the compartment 63. The horizontal duct 64 connects the hearth of the reduction furnace to upright duct 65 which enters the vaporization compartment 63. Heavy metal aluminum alloy depleted in aluminum returns through ducts 64 and 65 to the reduction furnace. A refractory bridge 67 separates the vaporization compartment 63 from the collection compartment 68. A vacuum chamber 70 is located above the compartments which is connected by pipe 71 to a vacuum pump (not shown). The collection compartment is connected to an upright duct 72 which enters a vessel 73 for receiving the collected aluminum. This vessel is preferably cooled by means of water pipes 74 embedded in the refractory.

Is is preferred to pump aluminum at a temperature near the melting point, about 660° C., from vessel 73 through pipe 75 by means of pump P into the upper part of chamber 70 and charge it through a nozzle 76 which can direct it as a spray or thin sheet downwardly across the vacuum chamber and towards the collection compartment to cool the aluminum vapor and effect its condensation.

An operation of the invention carried out in the apparatus of FIG. 1 will be described by way of illustration using iron as the metal to form a heavy metal alloy in the reduction furnace and magnesium as the light metal to effect separation of the aluminum. Assuming that the reduction furnace has a bath of heavy metal alloy A on the hearth consisting of about equal parts by weight of iron and aluminum and that the fusion F, for example of alumina and aluminum carbide, is floating over the alloy. The exit gases and metal vapors are removed through pipe 2 and any vaporized magnesium or aluminum therein are condensed in a condenser (not shown) following the method disclosed in my copending patent application Serial No. 197,124, filed May 23, 1962, now abandoned, for aluminum production. The heavy metal alloy of aluminum produced, such as 50% iron–50% aluminum, is drawn off through tap hole 6 into the feed leg 7 of the distillation furnace 8. Projecting into the feed leg is a carbon or graphite rod 29 secured by a rotating and feeding mechanism 30, 31 and 32 for rotating and feeding the carbon rod downward. The iron of the iron-alminum alloy dissolves carbon producing a so-called "cast iron" having a carbon content of about 4 to 5% and melting point preferably less than 1200° C. which is drawn out of the separating furnace through the tap hole 27 into the crucible 28.

The iron-aluminum alloy A′ in the bottom of the separating furnace varies from 30% to as low as 10% aluminum where it is drawn off through duct 27. Over this alloy A′ and in chamber part 14 is an aluminum-magnesium alloy C. The alloy D above the separation 10 in chamber part 13 is under a vacuum and the magnesium boils off and enters chamber 16 where it condenses to form the liquid pool L.

The separation of the iron from the aluminum-magnesium layer C is achieved by the difference in specific gravity of the layers A′ and C, and by the refractory separator 10 which permits the vaporized magnesium or aluminum-magnesium alloy to rise through one opening, for example 11, while the iron separater from the aluminum and falls through the other opening, for example 12, thus establishing a circulation in parts 13 and 14. Purified aluminum is tapped from hole 34 as often as desired and vacuum is supplied as needed by means of the vacuum pump 17 by which the magnesium is distilled into the condenser chamber 16 where it condenses as liquid L. The condensed magnesium L is drawn off at a temperature of about 660° C. through iron pipe 22 by cast iron pump 23 and is directed through iron pipe 26 into the iron-aluminum layer C or through iron pipe 25 into the aluminum-magnesium layer D as controlled by valves V.

The iron-aluminum alloy A′ contains from 30% to 10% or less of aluminum at the time it is drawn off through duct 27 depending on the thoroughness of fluxing with magnesium and alloying of the iron with carbon which both aid in the removal of the aluminum from the iron. The aluminum-magnesium alloy layer usually runs from 20% to 60% of magnesium in the first stage of the operation when the aluminum is being extracted from C into D. However, as vacuum is applied the magnesium is decreased by boiling off until only 0.5% magnesium or less remains in alloy D.

For the purpose of controlling temperature to the precise degree required for the alloys C and D the compartments 13 and 14 are provided with induction heaters I.

The alloy D rich in aluminum and containing a small amount of iron and magnesium is tapped out of chamber 13 from time-to-time through port 34. Thereafter it is transferred to a separate super-refining furnace (not shown) equipped with induction heating and vacuum attachments for settling out intermetallic compounds such as FeAl₃ and distilling off and collecting magnesium. Whereas the furnace chambers 13 and 14 are operated at 1200° to 1800° C. in separating iron and aluminum the super-refining furnace cools to only 550° to 575° C. and then for the next half-hour fluxes with aluminum chloride or chlorine to remove aluminum oxide and other gases while FeAl₃ is allowed to settle out and be pumped back to alloy C through pipes not shown. To minimize the amount of aluminum-magnesium pumped back to alloy C with the FeAl₃ precipitate, the metal may be filtered through a porous bed of refractory to separate out the FeAl₃. After settling out FeAl₃ the temperature of the aluminum-magnesium alloy is raised while vacuum is applied and practically all the magnesium is distilled off.

Any magnesium left in A′ is drawn off into the crucible 28 and this iron rich alloy is returned to the reduction furnace 1 to provide the iron for the heavy metal alloy. Any contained magnesium is distilled off through duct 2 and condensed as noted above.

To understand the mechanism of separations employed in this process it must be appreciated that magnesium does not form a true alloy with the above named heavy metals at high temperatures of 1300° to 1800° C. or more. In fact, magnesium would be eliminated as a vapor at such temperatures if it would not for the presence of aluminum alloyed with the heavy metal, which reduces the boiling point of magnesium, and if it were not for the fact that the design of the distillation furnace 8 makes possible the use of sufficient metal head at the point of injection of magnesium to apply enough pressure to reduce boiling. Thus, by employing high temperatures and pressure the dissociated or immiscible alloy of magnesium and aluminum is separated by difference in gravity.

In another important variation of my invention copper may be used as the heavy metal to collect and separate aluminum in the electrothermal reduction furnace 1 in FIG. 1. In this case the copper-aluminum alloy is represented as A in FIG. 1. From time-to-time this alloy composed of about 50% copper and 50% aluminum is withdrawn into a separating furnace similar to 8 shown in FIG. 1. Then lead is injected into the copper-aluminum alloy. Since copper dissolves in lead more readily than in aluminum, a heavy alloy of lead-copper alloy C forms in chamber 14 and a lighter alloy of aluminum-copper D forms in chamber 13 above. If, then, the distillation furnace is evacuated, lead boils off and is collected as E in the condenser 16 and is recirculated into D to completely dissolve copper from the aluminum and carry it into C. Lead remaining in D or C may be removed by distillation at 1717° C. at atmospheric pressure or as low as 1167° C. under vacuum of 10 mm. of Hg pressure.

Any lead remaining in the copper returned to the reduction furnace 1 in FIG. 1 will be removed therefrom by volatilization and can be collected in a condenser attached to duct 2 by methods described in my aforementioned copending application Serial No. 197,124.

Rather than using lead alone to remove copper from aluminum, lead may be used only at the higher temperatures at which the copper-aluminum alloy is withdrawn from the electrothermal reduction furnace, and cadmium-lead alloy or cadmium alone may be circulated through the aluminum to carry copper from the lighter aluminum layer into the heavier copper layer.

Cadmium, while much more expensive than lead, has a boiling point at atmospheric pressure of only 765° C. or at 200 mm. of Hg vacuum a boling point of 658° C. which is the melting point of aluminum. Cadmium is useful in removing the last traces of both lead and copper from aluminum since the cadmium itself may easily be volatilized leaving pure aluminum.

The following discussion will be helpful in understanding the operations of the invention carried out in the apparatus of FIGS. 2 to 7.

Since aluminum has a specific heat of about 0.26 and a heat of volatilization of about 2260 calories per gram, about 25.6 pounds of aluminum at 660° C. are used to condense one pound of aluminum vapor in order that there is not a rise in temperature of the resulting 26.6 pound stream to much more than 1000° C. The alloy of aluminum and the heavy, non-volatile metals (for example, ferro-silicon) may be assumed to have a specific heat of about 0.2 and the flow of this heavy metal alloy into the distillation furnace may be regulated so that it is cooled by the aluminum evaporating from it from an entering temperature of, say, about 2000° C. to an exit temperature from the vacuum furnace of, for example, 1200° C. Such temperature drop would then result in the loss of 160 calories per gram of alloy permitting 7.1 grams of aluminum to be evaporated from each 100 grams of alloy circulated through the distillation furnace and back into the reduction furnace. Thus an alloy of silicon-aluminum containing 50% aluminum entering the distillation furnace would be reduced to 42.9% aluminum leaving the distillation furnace. In the above example, it will be understood that the condensed aluminum will be increased in temperature by the average temperature of the vapor which may be about 1800° C. or more, but since in this example 25.6 pounds of aluminum are used to cool each pound of aluminum evaporated the temperature rise of the 25.6 pounds due to the higher temperature of the vapor would only be about 31° C. Since aluminum boils at 2057° C. at atmospheric pressure, the vacuum needed for evaporation at the temperatures of 1200° C. to 2000° C. need not be great, a vacuum pressure of several mm. of Hg being sufficient. However, the heavy, non-volatile metal lowers the partial vapor pressure of aluminum existing above the heavy metal alloy compared with the vapor pressure existing above pure aluminum at the same temperature and pressure.

The following discussion pertains to another variation of my process carried out in the apparatus of FIGS. 2 to 4. The electrothermal reduction operation carried out in this variation of my process in furnace 1 can be similar to that described with reference to FIG. 1.

The reduction furnace 1 has one or more openings 3 (normally kept closed) through which may be fed solid or molten mixtures of aluminum carbides and aluminum oxides (containing sometimes particles of metallic aluminum) as well as carbon, additions of heavy metal for alloying and fluxes when required as in the operation of FIG. 1.

Opening 2 is for the exit of gases (principally carbon monoxide, and vapors), from the reduction furnace and may lead to gas cleaning apparatus or to a fluidized bed preheater for aluminum oxides to be used in a thermoelectric furnace, or in a feeding furnace (not shown). The feeding furnace is utilized to react alumina with carbon to form a molten mixture of aluminum carbides and oxides which are then utilized as the raw feed for the reduction operation.

To avoid dust losses I prefer to make the feed for the reduction furnace entirely a molten mixture of aluminum oxides and carbides, and to make the feed to the feeding furnace (which supplies the reduction furnace) coarse, granular lumps composed of preheated alumina and carbon granules sintered together with recirculated molten aluminum carbide and oxide.

As described in relation to FIG. 2, the heavy metal alloy is A, which is substantially non-volatile at the temperature used, and the overlying fusion undergoing reduction floats on the alloy. The heavy metal alloy rich in aluminum flows preferentially through duct 35 and riser 38 into the metal in vaporization compartment 41, and the heavy metal alloy depleted in aluminum returns through ducts 39 and 36 as shown by the arrows. The circulation up in riser 38 and down in duct 39 is made self regulating by bubbles of vapor forming in the smaller cross-section of riser 38. This action may be aided by any volatile metal, such as magnesium, or carbon monoxide, injected into 38 at 51. The more the aluminum is evaporated the faster will be the circulation. This results in a circulation of the heavy metal alloy rich in aluminum to the distillation furnace and a return of heavy metal alloy depleted in aluminum to the reduction furnace. Since compartments 41 and 43 and chamber 42 are under a vacuum, the aluminum is boiled off leaving an alloy rich in the heavy metal for return to the reduction furnace. The aluminum is vaporized in compartment 41, passes through vacuum chamber 42 and is condensed in the collection compartment 43 by the spray of cooled liquid aluminum charged from pipe 49. The spray of liquid aluminum is produced by recirculating the liquid aluminum C by pump P through pipe 49 under the desired pressure. The pipe 47 leads to a vacuum pump (not shown) which, in addition to compartments 41, 43 and chamber 42 also removes gases dissolved in the metal. The vacuum pump should be capable of maintaining a vacuum of only a few millimeters of mercury. The condensed aluminum may be drained out of C from time-to-time through valve 50. However, the temperatures attained by the fusion F being 1800° to 2600° C. the metal A may easily average 2100° C. and the heavy metal alloy in compartment 41 which is cooled greatly by vaporizing aluminum may be 1700° C. or more. A small precentage of aluminum vaporizes from the alloy A which can be recovered from the vapors passing out of pipe 2.

The operation carried out in the apparatus of FIGS. 5 to 7 is generally similar to that carried out in the apparatus of FIGS. 2 to 4. The ducts 61 and 62 through which the heavy metal alloy rises can be cooled if desired and to facilitate the flow of alloy into the compartment 63, carbon monoxide gas may be injected through pipe 77. One important feature of this aspect of my invention resides in cooling the collected aluminum in vessel 73 to about 660° C. This cooled aluminum greatly facilitates the condensation of the aluminum vapor in the collection chamber 68.

The heavy metal may be one or a mixture of metals having higher boiling points than aluminum some of which are shown below with temperatures at which they boil.

| Metal: | Boiling point at Atmospheric pressure, ° C. |
|---|---|
| Aluminum | 2057 |
| Manganese | 2150 |
| Silicon | 2300 |
| Chromium | 2500 |
| Copper | 2600 |
| Nickel | 2730 |
| Iron | 2740 |
| Cobalt | 2900 |
| Titanium | 3260 |
| Tungsten | 5900 |
| Zirconium | 2900 |

I prefer alloys of aluminum with silicon, copper or iron to provide an alloy of low melting point and viscosity and not sufficiently volatile to contaminate the aluminum while at the same time not lower the vapor pressure of the aluminum alloy so much that aluminum cannot be evaporated at high vacuum at 1700° C.

The vapor pressure of pure aluminum is as follows:

| Aluminum vapor mm. of mercury pressure: | Temperature, ° C. |
|---|---|
| 1 | 1284 |
| 10 | 1487 |
| 100 | 1749 |
| 200 | 1844 |
| 400 | 1947 |

The effectiveness of magnesium in lowering the boiling point of aluminum-magnesium alloys is shown below:

| Percent Contained Metals in Alloy Evaporated | | Boiling Temperature of Alloy at Atmospheric Pressure, ° C. |
|---|---|---|
| Aluminum | Magnesium | |
| 100 | 0 | 2,047 |
| 80 | 20 | 1,300 |
| 60 | 40 | 1,200 |
| 40 | 60 | 1,150 |
| 20 | 80 | 1,115 |
| 0 | 100 | 1,103 |

In case a low boiling point metal like magnesium is injected into the heavy metal alloy as at 51 in FIG. 2 a succession of condensers like 46 in FIG. 2 is provided to condense aluminum at a temperature of about 1100° C. at which magnesium will still vaporize and pass over to the next condenser. The following table lists the conditions making this possible.

mm. of mercury magnesium
vapor pressure:                    Temperature, ° C.
1.0 _____ 621
10 _____ 702
100 _____ 909
200 _____ 967
400 _____ 1034

One advantage of my invention is that the high temperature used for thermoelectric reduction is utilized to vaporize aluminum from the metal alloy A' in the succeeding recovery stage.

If the reduction furnace 1 were to be evacuated, considerable contamination would be experienced with volatile aluminum oxides, and dust would be carried over with the exhaust gases in duct 2. The process of the invention, accordingly, makes it possible to protect aluminum from volatilizing in the reduction furnace by use of normal pressures and a heavy, high boiling point metal alloyed with the aluminum.

In either variation of the process described in using as oxidic raw material calcined bauxite, clay or shale, there are impuritieis such as iron, silicon, and titanium reduced into the heavy metal alloy which accumulate therein as the aluminum is volatilized therefrom. To dispose of the said impurities which thus accumulate I from time to time concentrate them by stopping addition of aluminous raw material while continuing to volatilize aluminum from the alloy in the reduction furnace until the aluminum content of the alloy is considerably reduced and an alloy by-product, a ferro-silicon-titanium-aluminum, is formed. This alloy is tapped out of the reduction furnace and may be used in the steel industry as deoxidation material. I prefer to volatilize aluminum from the heavy metal alloy until the content of aluminum is less than 22%, preferably from 5% to 10%, before drawing off the by-product alloy of iron-silicon-titanium-aluminum.

When using bauxite as oxidic material it is preferred to effect some purification by subjecting the bauxite to reduction in two steps, preferably in two electric furnaces. In the first step the bauxite is fused with suitable amounts of carbon or carbides to reduce just the silicon, titanium and iron with very little aluminum being reduced, resulting in an aluminum oxide-carbide slag (purified of iron, silicon and titanium) which is withdrawn to a second arc furnace where the aluminum is reduced into a heavy metal alloy. From time to time the by-product iron-silicon-titanium alloy is separately withdrawn from the first furnace. This alloy has various uses as deoxidizing material.

My invention likewise contemplates the use of slags containing besides aluminum oxides and carbides, such fluxes as calcium or magnesium compounds, or fluxes such as sulfur or sulfides as taught by Haglund 1,512,462 or Onda 760,554 to reduce reaction temperatures and dissolve better the oxides and carbides present.

The volatile impurities that accumulate in the heavy metal alloy are separated from aluminum during volatilization by differences in temperature. If the aluminum condensation be performed with aluminum and cooled to 800° C. to 1100° C. most of the volatile impurities which might be present are in the gaseous phase while aluminum is in the liquid phase.

I claim:

1. The improved process for the production of aluminum which comprises charging into an electric arc reduction furnace a mixture of oxidic aluminum and carbonaceous reducing agent, providing in the reduction furnace a heavy metal alloy of aluminum and a metal of the group consisting of iron, silicon, molybdenum, chromium, vanadium, titanium, cobalt, tungsten and zirconium, fusing the oxidic material and floating it over the heavy metal alloy, reducing aluminum from the fusion into the heavy metal alloy, flowing the heavy metal alloy into another furnace which is under a vacuum and at a lower temperature than the reduction furnace, vaporizing aluminum from the heavy metal alloy and returning the heavy metal alloy thus depleted in aluminum to the reduction furnace, and condensing the aluminum vapor.

2. In the process of claim 1, flowing heavy metal alloy from the reduction furnace through a duct upward into a vacuum chamber, vaporizing aluminum from the heavy metal alloy and returning heavy metal alloy depleted in aluminum from the vacuum chamber to the reduction furnace through another duct, the flow of metal through both ducts being by gravity action.

3. In the process of claim 1, flowing heavy metal alloy from the reduction furnace upward into a vacuum chamber, vaporizing aluminum in the vacuum chamber, and injecting the condensed liquid aluminum into the aluminum vapor in the chamber to effect condensation.

4. In the process of claim 3, cooling the condensed aluminum to near its melting point and injecting the cooled aluminum into the aluminum vapor to effect condensation.

5. The improved process for producing commercially pure aluminum which comprises providing in an electric reduction furnace a bath of a heavy metal aluminum alloy, said alloy being formed of a heavy metal of the group consisting of iron, silicon, molybdenum, chromium, vanadium, titanium, cobalt, tungsten and zirconium, and aluminum, maintaining over the heavy metal alloy a fusion of alumina and a carbonaceous reducing agent and reducing aluminum therefrom into the heavy metal aluminum alloy, passing the heavy metal aluminum alloy enriched in aluminum into a compartment of a distillation furnace operated at a reduced pressure and vaporizing aluminum from the heavy metal aluminum alloy into a vacuum chamber, returning the heavy metal aluminum alloy depleted in aluminum to the electric reduction furnace for a repetition of the operation therein, passing liquid aluminum at a temperature near its melting point into contact with the aluminum vapors in the vacuum chamber of the distillation furnace and condensing the aluminum vapors to liquid aluminum, and collecting the liquid aluminum for removal from the chamber.

6. In the process of claim 5, feeding into the electric arc furnace a charge mixture of alumina and aluminum carbide.

7. In the process of claim 5, flowing the heavy metal aluminum alloy by gravity through a duct connecting the electric reduction furnace to a distillation furnace located above the reduction furnace in which aluminum is removed by vaporization, and returning the heavy metal aluminum alloy depleted in aluminum through another duct to the reduction furnace.

8. In the process of claim 5, passing a stream of liquid aluminum at a temperature of about 660° C. into the chamber and into contact with the aluminum vapor to condense the aluminum vapor to liquid aluminum and collecting the condensed aluminum out of contact with the heavy metal aluminum alloy undergoing vaporization in the compartment.

9. Apparatus for the electrothermal reduction of aluminum which comprises an arc furnace for confining a bath of heavy metal aluminum alloy and reducing aluminum from an oxidic aluminum charge into the heavy metal aluminum alloy, a distillation furnace in operative connection with the arc furnace, duct means for passing the heavy metal aluminum alloy into the distillation furnace, a vacuum chamber in the distillation furnace for vaporizing aluminum from the heavy metal aluminum alloy, means for condensing the aluminum vapor in the vacuum chamber, and means for returning heavy metal aluminum alloy depleted in aluminum to the arc furnace.

10. Apparatus for the production of aluminum which comprises an electric arc reduction furnace having a hearth for confining a bath of a heavy metal aluminum alloy and means for feeding into the reduction furnace aluminum oxide and a reducing agent to form a fusion over the heavy metal aluminum alloy, a distillation furnace in operative connection with the reduction furnace, the distillation furnace having a vacuum chamber at an elevation above the hearth of the reduction furnace, the distillation furnace having two compartments below the vacuum chamber, one a vaporization compartment connected by two ducts to the reduction furnace, and one an aluminum collection compartment, one of said ducts being arranged for the flow by gravity of heavy metal aluminum alloy from the reduction furnace into the vaporization compartment and the other duct being arranged for the return by gravity of heavy metal aluminum alloy from the vaporization compartment to the reduction furnace, means for injecting into the vacuum chamber liquid aluminum to condense the aluminum vapor, and means for removing collected condensed aluminum from the collection compartment.

11. Apparatus according to claim 10, which comprises a vessel for receiving aluminum from the collection compartment and cooling the aluminum to near its melting point, and means for removing liquid aluminum from the vessel and injecting it into the vacuum chamber.

12. Apparatus for the production of aluminum which comprises in combination an electric arc reduction furnace having a hearth for confining a bath of heavy metal aluminum alloy into which aluminum is reduced from an overlying fusion of aluminum oxide and a reducing agent, a distillation furnace connected to the reduction furnace by two spaced ducts, the distillation furnace having an aluminum vaporization compartment, an aluminum collection compartment and a vacuum chamber above the compartments, said compartments and vacuum chamber being at a level above the hearth, one of said ducts being for the gravity flow of heavy metal aluminum alloy rich in aluminum into the vaporization compartment and the other duct being for the return by gravity flow of heavy metal aluminum alloy depleted in aluminum to the reduction furnace, means for injecting liquid aluminum into aluminum vapor in the vacuum chamber to condense aluminum, and means for removing liquid aluminum from the collection compartment.

13. Apparatus according to claim 12 which comprises refractory lined ducts for the flow of metal from the reduction furnace to the distillation furnace, and means for cooling the duct for flowing heavy metal aluminum alloy from the reduction furnace into the vaporization compartment.

No references cited.

DAVID L. RECK, *Primary Examiner.*
WINSTON A. DOUGLAS, *Examiner.*